Nov. 6, 1928.

A. P. FAHNESTOCK 1,690,220

GROUND CONNECTER

Filed May 13, 1926

Patented Nov. 6, 1928.

1,690,220

UNITED STATES PATENT OFFICE.

ARCHER P. FAHNESTOCK, OF PLANDOME, NEW YORK.

GROUND CONNECTER.

Application filed May 13, 1926. Serial No. 108,718.

This invention relates to ground connecters of the type intended to be clamped around a pipe or equivalent ground conductor.

An object of the invention is to provide an inexpensive practical connecter of this kind which shall be adjustable to various sizes of pipe, with provision for good electrical contact between connecter and the pipe.

Other objects and aims of the invention, more or less broad than those stated above, together with the advantages inherent, will be in part obvious and in part specifically referred to in the course of the following description of the elements, combinations, arrangements of parts, and applications of principles constituting the invention; and the scope of protection contemplated will appear from the claim.

Figure 1:
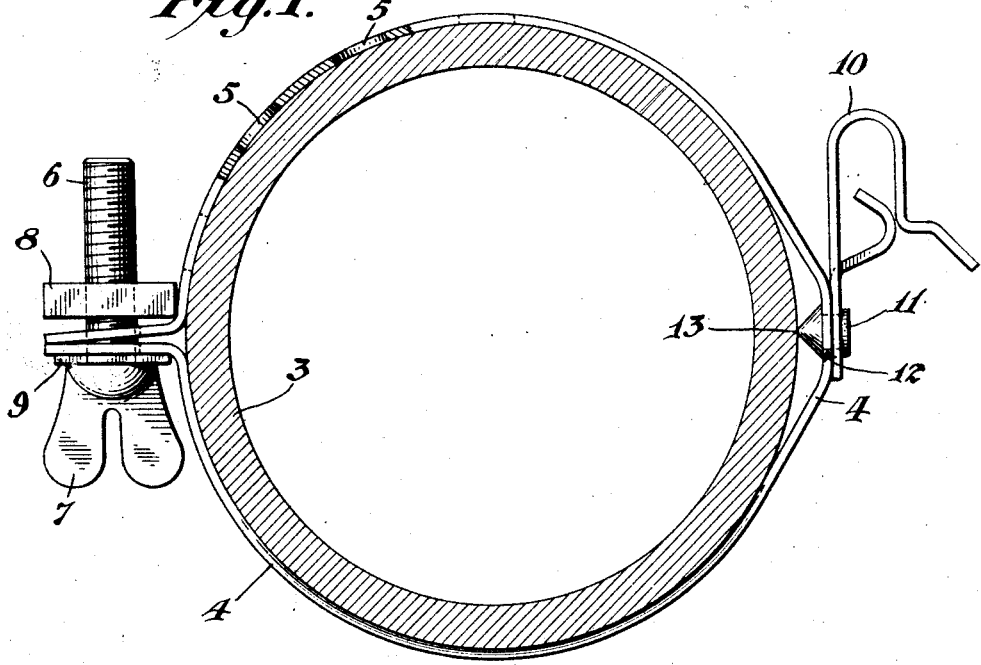
Figure 2:
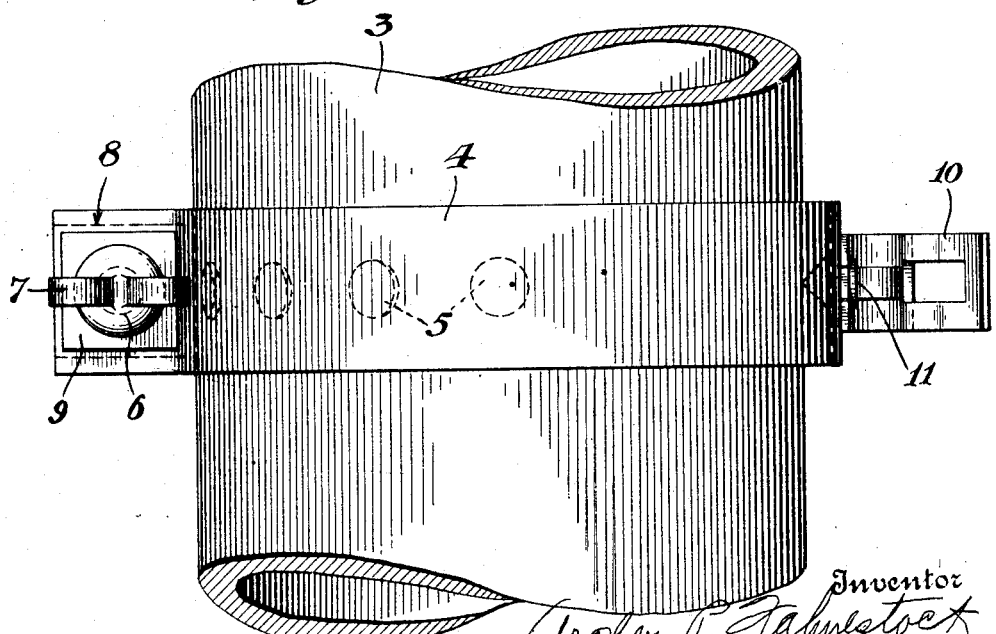

In the accompanying drawings, which are to be taken as part of this specification, and in which I have shown merely a preferred form of embodiment of invention, Figure 1 is a horizontal sectional view through a pipe with a ground clamp embodying my invention in operative relation thereto; and Fig. 2 is a view in side elevation illustrating the subject matter of Fig. 1, with the ends of the pipe broken away.

Referring to the numerals on the drawing, 3 indicates a water, gas or other pipe, and encircling the same is a flexible band 4 formed of suitable sheet metal, provided with spaced apertures 5 along its length. The two ends of the band are also apertured, and through these end apertures passes the threaded shank 6 of a screw, which is provided with a wing head 7. 8 indicates a nut interiorly threaded to correspond with the threading of the screw 6, and 9 indicates a square washer which lies under the wing head 7.

At some intermediate point in the length of the band I prefer to attach to the band a connecter or clip for a wire. In the drawing I have shown a familiar Fahnestock clip at 10, and the clip is secured to the band by means of a special rivet. As clearly shown in Fig. 1, the rivet has a head 11 which is upset against the outer surface of the clip portion through which the shank 12 of the rivet passes. The shank 12 also passes through the band 5 and beyond the inner face of the band is enlarged to take the form of a cone, for example, the point 13 of which is intended to bite into the opposed surface of pipe 4, piercing through any surface coating of the pipe to insure good electrical contact. Good surface contact between the band and the pipe, and penetration of the pipe surface by the rivet point 13, is accomplished by drawing together the ends of the band as indicated in Fig. 1. The shank 6 of the screw passes through the square washer 9, through the apertured ends of the band and into the square nut 8. Upon turning the screw 6 the band ends will be drawn together until the band tightly embraces the pipe, this of course resulting incidently in drawing the point 13 of the rivet into the pipe surface. In the illustration of Fig. 1 the screw passes through the band ends, but it will of course be understood that with pipes of smaller sizes the apertures 5 will be utilized in an obvious manner.

The advantages of the construction above described will be clear, but it may be pointed out that the cone rivet serves a double function, that is, it holds the clip in mechanical and electrical relation to the band and also ensures good electrical connection between the ground pipe, the band and the clip. Furthermore, by reason of the fact that it penetrates the pipe, it minimizes the liability of slippage of the band upon the pipe.

The function of the square washer 9 is to preserve the adjacent band end against the destruction or disintegration due to the repeated manipulation of the screw; and the equipment of the screw with the wing head 7 is important because thereby it becomes feasible to connect or disconnect the clamp without the use of any tools whatever.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claim is intended to cover all the generic and specific features of the invention herein described and all statements of the scope of the invention which, as a matter of language, might be said to fall therebetween.

I claim:

In a ground wire attachment, a pipe gripping band having a flat central portion and confronting arcuate portions on each side terminating in opposed outwardly projecting ends having registering bolt receiving openings, said flat portion being disposed diametrically opposite said ends and adapted to lie in spaced relation to the pipe on which the clamp is positioned, a rivet having a pointed head resting on the inside of the flat portion of the band and adapted to have the point engage the material of the pipe, a ground wire clamp resting on said flattened portion, a second head on said rivet securing the ground wire clamp to the flattened portion, and a bolt passing through the bolt openings to draw the ends together and force the point of the rivet into the material of the pipe.

In testimony whereof I affix my signature.

ARCHER P. FAHNESTOCK.